F. A. POOLE.
CALCULATING MECHANISM.
APPLICATION FILED OCT. 8, 1909.
1,056,578.
Patented Mar. 18, 1913.
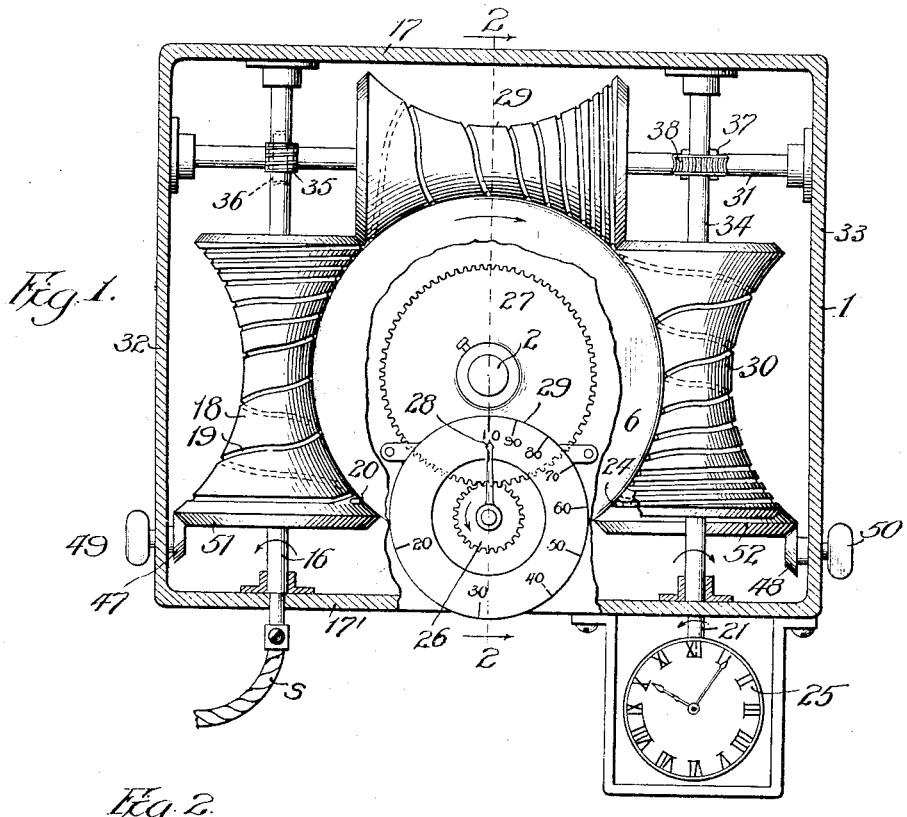
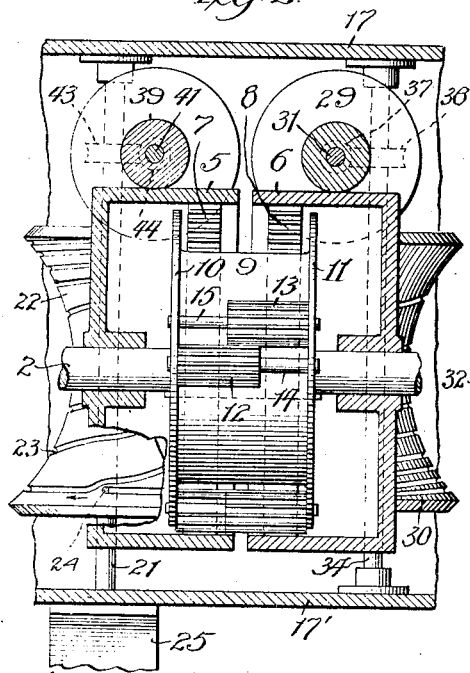
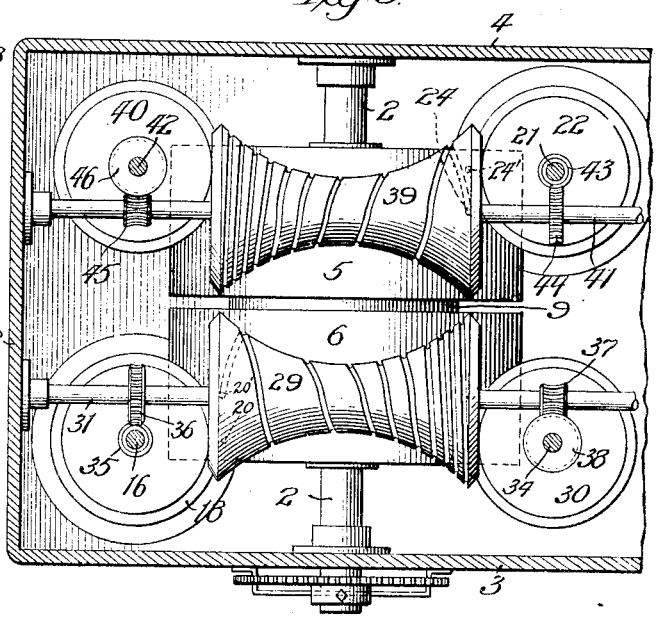
Witnesses:
Ed. C. Doiron
Charles J. Schmidt.
Inventor:
Frederick A. Poole
By Offield, Towle, Graves & Offield
Attys

UNITED STATES PATENT OFFICE.

FREDERICK A. POOLE, OF CHICAGO, ILLINOIS.

CALCULATING MECHANISM.

1,056,578.  Specification of Letters Patent.  Patented Mar. 18, 1913.

Application filed October 8, 1909. Serial No. 521,682.

*To all whom it may concern:*

Be it known that I, FREDERICK A. POOLE, a resident of Chicago, in the county of Cook and State of Illinois, have invented certain new and useful Improvements in Calculating Mechanism, of which the following is a full, clear, and precise specification.

My invention relates to calculating mechanism which is particularly adaptable for calculating and indicating directly the average rate of motion, although the mechanism is useful for performing other calculations and indicating results thereof.

Average rate of motion combines sets of distance increments and time increments to produce rate increments which are averaged to produce a final average rate element. This calculation involves processes of division. If two natural numbers are added we obtain a sum, and if the numbers are subtracted we obtain a difference. However, if the logarithms of the natural numbers are added the anti-logarithm of the sum will be the product of the natural numbers, and if the logarithms of the natural numbers are subtracted the anti-logarithms of the difference will be the quotient of the natural numbers. Likewise, in the case of two moving members, by adding the distance traveled by the members we obtain the sum of the distances and if the distances traveled by the members are subtracted we obtain a difference of the distances, while if the logarithms of the distances traveled by the members are added the anti-logarithm of the sum will be the product of the distances, and if the logarithms of the distances traveled are subtracted the anti-logarithm of the difference will be the quotient of the distances.

The main object of my invention, therefore, is to provide mechanism comprising two motion trains driven at one end in proportion respectively to the elements of the quotient, the arithmetic motions being translated by the trains into logarithmic motions to produce a logarithmic difference, and to provide further indicating mechanism which operates logarithmically to indicate the anti-logarithm of the logarithmic difference and thus to indicate the arithmetic quotient of the element. For example, if the arithmetic dividend element is distance and the arithmetic divisor element is time, the indication will be the arithmetic quotient representing rate. If a number of element increments are entered on the motion trains the resulting quotient increments will be averaged up so that the final indication will represent the arithmetic average rate, and therefore, if a number of increments of time are entered on a time train and a number of distance increments entered on a distance train the indication will give the average of the various rate increments and will represent the average rate.

I shall describe an embodiment of my invention which is particularly adaptable for indicating average rate of travel of vehicles such as automobiles, and from this description it will be plain that the mechanism can be used directly or in modified form for indicating average rate of other elements, as, for example, the average rate of consumption of electric current or the average rate of air flow or water flow.

In the accompanying drawing which illustrates one embodiment of my invention which adapts it particularly for use on vehicles Figure 1 is a front view of an instrument for carrying out the purpose and features of my invention, parts of the inclosing case being broken away, Fig. 2 is a sectional view taken on plane 2—2, Fig. 1, and Fig. 3 is a plan view, the top of the inclosing case being removed.

The inclosing case 1 for the instrument shown is rectangular in shape and journals a shaft 2 in its front and rear walls 3 and 4, as best shown in Fig. 3. On this shaft are pivoted the two differential members 5 and 6 having respectively the internal teeth 7 and 8. Secured to the shaft 2 is a cylinder 9 having side flanges 10 and 11 between which are pivoted sets of differential pinions. Each set comprises pinions 12 and 13 mounted on shafts 14 and 15 respectively, which shafts are journaled in the flanges 10 and 11. Pinions 12 and 13 mesh with each other and the pinions 12 of the sets mesh with teeth 7, while the pinions 13 of the sets mesh with teeth 8. The outside of the differential members 5 and 6 present cylindrical surfaces of equal diameter. A shaft 16 journals in the top and bottom walls 17 and 17' of the casing 1 and carries a spool shaped cam 18 whose concave sides have substantially the same radius as that of the differential members 5 and 6, the shaft 16 being situated so that the surface of the cam will coincide with the surface of the differential member 6. Cut about the surface of the cam is a cam slot 19 receiving a tooth 20 extending from differential member 6 so that rotation of shaft 16 and cam 18 will cause rotational movement of the member 6. In practice the shaft 16 is connected with the running gear of the vehicle by means of flexible shafting s or other transmitting mechanism, the speed of the shaft and cam being directly proportional to the distance covered by the vehicle. The shaft 21 parallel with shaft 16 is journaled in the top and bottom walls 17 and 17' of the casing, but is at the other side of the differential members and carries a spool shaped cam 22 which is similar to cam 18 and which receives the section of the surface of differential member 5 diagonally opposite the surface covered by cam 18 on differential member 6. Cam 22 has a spiral groove 23 receiving a tooth 24 extending from differential member 5 so that turning of this cam will result in rotation of said member 5. In practice shaft 21 connects with and is driven by time mechanism such as a clock 25.

As rate is a quotient cams 18 and 22 must be driven in opposite directions. If the cams are driven arithmetically at different rates the difference in movement of the differential members would indicate merely the arithmetical difference between the individual movements of the gears. Therefore, in order that the differential movement may be indicative of rate the differential members must be driven logarithmically. The cam grooves must, therefore, be in the form of logarithmic spirals. The difference in distances of travel of the differential members will be equal to or proportional to the anti-logarithm of the quotient or rate elements, and in order to directly indicate the quotient the difference movement which is communicated to the cylinder 9 and shaft 2 is transmitted through suitable gears 26 and 27 to a pointer 28 traveling over a dial 29 on which the arithmetic rate indicating numbers are spaced logarithmically. The clock and the vehicle, therefore, produce arithmetic bodily rotation of the gears 22 and 18 respectively in proportion to the time and distance elements, and this arithmetic movement is translated into logarithmic movement of the differential members while the logarithmic difference of movement of the differential members is translated into arithmetic indication of the rate element.

Suppose that the driving connection between cam 18 and the vehicle running gear is such that the cam will turn one revolution for each mile of travel, then, the capacity of the instrument in miles of travel will be determined by the number of turns in the spiral groove 19. The most convenient logarithmic base to use for devices of this kind is ten and therefore cam 18 will have ten turns as shown, the capacity in miles of travel then being ten miles. Cam 22 also has ten turns and if this cam is driven ten revolutions per hour each turn would represent six minutes. The time cam will rotate at a constant speed, that is, at a rate of one revolution per six minutes. If the average rate of travel of the vehicle is ten miles per hour, then both cams rotate at the same speed and the pointer remains at rest. If the average rate of speed becomes greater or less than ten miles per hour the pointer will move to give the proper indication. Ten miles and one hour are very small space and time capacities particularly for long distance vehicles such as automobiles where a capacity of 1000 miles for distance and 100 hours for time would be much more desirable. It is easily seen that if these large distance and time capacities were to be accommodated on a single cam the cams and the differential mechanisms would have to be exceedingly large. Instead, therefore, of having single cams I utilize a number of smaller cams geared together in suitable ratio and associated with the differential members to cause the proper rotation thereof. As shown in Fig. 1 the distance element is controlled by a train of three cams, 18, 29 and 30. These cams are similar and are of a length so that each cam covers ninety degrees of the circumference of the differential member 6. Cam 29 is mounted on a shaft 31 which journals in the side walls 32 and 33 of the casing, while cam 30 is carried on shaft 34 journaled at its ends in the top and bottom walls 17 and 17'. Shaft 16 carries a worm 35 which meshes with a wheel 36 carried by shaft 31. Shaft 31 at its other end carries a worm 37 meshing with a worm wheel 38 on shaft 34. The gear relations between the worm and worm wheels is such that cam 29 rotates one-tenth as fast as cam 18 and cam 30 rotates one-tenth as fast as cam 29. The time element is controlled by a train of three cams, 22, 39 and 40, cam 39 being mounted on shaft 41 and cam 40 being mounted on shaft 42. Shaft 21 carries a worm 43 meshing with worm wheel 44 on shaft 41, and shaft 41 at its other end carries a worm 45 meshing with worm wheel 46 on shaft 42, so that cam 39 rotates one-tenth as fast as cam 22 and cam 40 rotates one-tenth as fast as cam 39. Cams 22, 39 and 40 each cover one-fourth of the circumference of differential member 5, the ends of the cams engaging so that the cam grooves thereof connect with each other. With this arrangement of cam mechanism a very compact construction is possible with a large distance, time, and average rate capacity. Each cam having ten turns, and the cams of each train being progressively geared from 10 to 1, each train constitutes a decimal progression in which the gears represent the decimal orders. With cam 18 alone the distance capacity would be only ten miles. By adding cam 29 the distance will be increased to one hundred miles, and by adding cam 30 the distance will be increased to one thousand miles and so on. In the same way the cam 39 increases the time capacity to ten hours and the addition of cam 40 increases the time capacity to one hundred hours. The gearing between the cams of each train can be such that the contact lines of the gears with the differential members will be in a common plane, so that tooth 20 will serve for engagement with all the cams of the distance train and so that tooth 24 will serve for engagement with all the cams of the time train. However, with the worm and worm wheel gearing arrangement as shown cam 29 is slightly to one side of the common plane of the gears 18 and 30, and likewise cam 39 of the time train is slightly to one side of the plane of gears 22 and 40. I therefore provide additional teeth 20′ and 24′, tooth 20′ being in position to be carried into the groove of cam 29 when tooth 20 leaves the groove of cam 18 and likewise tooth 24′ being in position to be carried into the groove of cam 39 when tooth 24 leaves the groove of cam 22. Teeth 20 and 24, however, coöperate with cams 30 and 40 respectively as soon as teeth 20′ and 24′ leave cams 29 and 39 respectively.

If the spiral groove were laid off arithmetically each turn would carry through a distance equal to one-tenth of the cam surface, that is, for each rotation of the cam the engaging tooth on the differential member would be moved an equal distance. In other words, if the spiral were arithmetic the divisions along the engaging cam surface would be equal and would be along an arithmetical or natural scale 0 to 10, the first turn extending from points 0 to 1, the second turn from points 1 to 2, the third turn from points 2 to 3, and so on. If the groove is a logarithmic spiral the distance between turns are no longer equal but are in proportion to the logarithmic functions of the natural numbers 0 to 10. For example, the first turn which extends from 0 to 1 on the arithmetic scale would, in the logarithmic scale, extend from minus infinity to 0, minus infinity and 0 being respectively the logarithms of 0 and 1. The second turn would end at point 2 on the arithmetic scale but on the logarithmic scale the second turn would end at a distance from the logarithmic 0 point proportional to the number .301 which is the logarithm of 2. In the same way the third turn would end at point 3 on the arithmetic scale but on the logarithmic scale would end at a point proportional to .477 which is the logarithm of 3. The first turn extending from minus infinity to 0 would, of course, be endless and could not be utilized in any mechanical structure. I, therefore, bring together or compress the first or 0 to 1 turn into a plane perpendicular to the cam axis at the beginning of the second or 1 to 2 turn, so that the first turns on the cams are zero turns which will cause no movement of the differential members 5 and 6. In other words, during the first mile and first six minutes of travel the corresponding differential members will not be driven. As soon, however, as the second turns of the cams become effective the differential members will be driven and proper indication of the average rate given.

As the differential cylinder 9 and the pointer geared thereto are driven logarithmically in proportion to the logarithmic movement difference between the differential members 5 and 6 the indicating points on the dial must be spaced logarithmically so that the numbers at these points can be construed arithmetically as indicative of the rate element. If the distance cam carries tooth 20 through the zero turn in six minutes then both distance and time cams 18 and 22 start at the same time at their second turns or at an average rate equal to ten miles per hour, and the first point on the dial should, therefore, be ten. If both the cams maintain uniform rate of travel teeth 20 and 24 will reach the end of cams 18 and 22 at the same time and the speed will still be ten miles per hour. If, however, cam 18 rotated ten times during the first revolution of the cam 22, a distance of ten miles will have been covered in six minutes and the average rate will be one hundred miles per hour, and therefore the tenth division on the dial should be indicative of one hundred miles average rate. If the pointer travels through 360 degrees to indicate from the average rates of 10 to 100, the 100 mark will coincide with the 10 mark and the other points 20 to 90 will be laid off at logarithmic intervals around the circumference of the dial. As has already been mentioned, the cams each cover one-fourth of the circumference of the differential members, or in other words, each cam extends over a polar angle of ninety degrees. Therefore, when the tooth 20 travels along the entire length of cam 18 during the time that tooth 24 remains in the zero turn of the time cam differential member 6 will have rotated through ninety degrees while member 5 remained at rest, and the differential movement is ninety degrees. For this ninety degree difference shaft 2 will rotate through only forty-five degrees, and therefore, in order that the pointer can move around three hundred sixty degrees to register from 10 to 100 the gear relation of gears 26 and 27 must be 1 to 8. Before starting a run of which the average speed is to be determined the cam members are brought back to a starting position in which teeth 20 and 24 engage at the beginning of the zero turns of cams 18 and 22. This re-setting can be accomplished in any desirable manner. As shown, bevel pinions 47 and 48 are journaled in walls 32 and 33 controlled by actuating ends 49 and 50 at the outside of the casing. The pinions mesh with bevel teeth 51 and 52 cut in the edges of cams 18 and 22 respectively. By turning the ends 49 and 50 the cams can be restored to bring the apparatus to starting position.

To illustrate more fully the operation of the mechanism, suppose that the parts are at their starting position, the machine is started and the clock simultaneously connected for operation so that cams 18 and 22 will be rotated by the traveling vehicle and by the clock respectively. During the first mile of distance and the first six minutes of travel cams 18 and 22 respectively will not cause any movement of differential members 6 and 5 respectively and the pointer will remain at rest at the 10 mark. If at the end of the first six minutes the vehicle has traveled one mile then the second turns of the cams will become effective simultaneously and if the vehicle continues to run at an average rate of ten miles per hour or one mile for every turn of the space cam the pointer would remain at rest at the 10 mark. As soon as the second turns become effective the instrument will begin to register accurately as the differential member teeth travel along true logarithmic spirals. If the speed of rotation of cam 18 is greater than the uniform speed of rotation of time cam 22, then differential member 6 travels faster than differential member 5 and the pointer moves from the 10 toward the 20 mark, and if the speed of rotation of cam 18 is less than that of cam 22 then the pointer will travel in the opposite direction, the pointer in any position indicating the average speed in miles per hour from the time of starting the vehicle up to the time when the indication of the pointer is read. Suppose that the ten mile rate is kept up for the first two miles or until the first two turns of both cams have been covered, and suppose that the operator then desires to increase his average speed to twenty miles per hour. The speed must then be increased beyond a twenty mile per hour rate until the average speed for the various miles covered will equal twenty. For example, the operator can immediately, at the end of the second turn, increase the speed to forty miles per hour and he must keep up this speed for six minutes or one complete turn of the time cam. In other words, for the next turn of the time cam the distance cam must rotate four turns to cover four miles in six minutes. This means that at the end of the sixth turn on the distance cam and at the end of the third turn on the time cam the differential member 6 will have traveled four times the distance (logarithmic) that the time differential member 5 has traveled, and the differential shaft 2 will have traveled only one-half the differential distance (logarithmic) of the cam members, and the pointer consequently will have moved from 10 to the 20 mark to indicate an average speed of twenty miles per hour. The distance cam will have turned six revolutions, which is equivalent to six miles of travel of the vehicle, and the time cam will have turned only three revolutions, which corresponds to a time period of eighteen minutes. Six miles have, therefore, been traveled in eighteen minutes, which is equivalent to an average rate of twenty miles per hour. In other words, during the first six minutes of travel one mile was covered; during the second six minutes another mile was covered; and during the third six minutes four miles were covered, making a total of six miles for eighteen minutes, which is at an average rate of one mile in three minutes or twenty miles per hour. In logarithmic figures the various dimensions would be as follows: Suppose that the circumference of the differential members is eight inches and that the engaging surface of each cam is two inches. If the first arithmetic turn 0 to 1 were laid out logarithmically on the cam it would extend from minus infinity to 0, that is, it would extend in proportion to the logarithms of 0 and 1. As already stated, it would be mechanically impracticable to make use of this part of the curve, and this first section of the curve is, therefore, all accumulated into a zero turn which will cause no movement of the differential members. The part of the logarithmic cam which is practically utilized extends arithmetically from 1 to 10 and logarithmically from 0 to 1. If the cam were divided arithmetically we would have nine equal divisions marked off by ten equally distant spaced points running from 1 to 10. The distances between turns, however, are logarithmic. The first logarithmic space from minus infinity to 0 we have merged into a zero turn. The logarithmic length of the second space will be the difference between the logarithms of 1 and 2 or .301, that is, the fraction which this length is of the entire logarithmic distance from 0 to 1 is expressed by the decimal .301. The third logarithmic turn will have an active length equal to the difference between the logarithms of 2 and 3 and will be represented by .176, and so on, the various decimals representing the nine logarithmic distances and when added together equaling 1. The cam active surfaces, however, are two inches long and, therefore, to give the actual distance in inches the various decimals must be multiplied by 2. For example, the active distance of the second turn would be .602 inches, that is, the differential tooth upon passing through the second turn of the cam slot will travel .602 inches; upon engagement with the third turn it will move .352 inches, and so on, the total distance traveled by a tooth upon engagement with one cam being two inches. Therefore, with the example of operation before given both teeth 20 and 24 at the ends of the second turns will have traveled .602 inches, there having been no movement of the teeth when engaged by the first or zero turn. Both cams traveled at the same rate, the distance cam having traveled a distance corresponding to two miles travel of the vehicle, and the time cam having rotated for a period of twelve minutes. The speed was now increased to forty miles per hour, and, therefore, for the next turn of the time cam the distance cam made four revolutions, tooth 24 being then at the end of the third turn of the time cam, and tooth 20 being at the end of the sixth turn of the distance cam. The entire distance traveled by tooth 24 from the time of starting is now .477×2 inches or .954 inches, and the entire distance traveled by tooth 20 from the time of starting is now .778×2 inches or 1.556 inches. The logarithmic differential movement is .301×2 inches or .602 inches. The anti-logarithm of .301 is 2 and, therefore, the pointer will travel to the second division on the scale and will indicate 20 to show that the average rate of speed has reached twenty miles per hour. In other words, the rate multiple has become 2 and the average speed has become twice ten miles per hour or twenty miles per hour. During the time that the third, fourth, fifth and sixth turns of the distance cam were associated with tooth 20 and turn three of the time cam was associated with tooth 24 the rate multiple varied gradually from 1 to 2, and the pointer moved gradually from the 10 mark to the 20 mark to indicate all intervening average rate distances. If the rate of forty miles per hour is maintained after the sixth turn and for the next period of six minutes, tooth 20 will reach the end of the space cam groove and tooth 24 will reach the end of the fourth time turn. Tooth 20 will then have traveled the entire length of cam 18 and tooth 24 will have traveled a decimal part of the time cam represented by .602. The entire distance of cam 18 is represented by 1, which is the logarithm of 10, and .602 is the logarithm of 4. Therefore, the average rate multiple is 2½, which means that the average rate is now twenty-five miles per hour and this will be indicated on the scale. The pointer has thus far traveled from 10 and has indicated all the intervening average rates between 10 and 25. Suppose that after the end of the second turn, when the speed was ten miles per hour, it was desired to travel at a slower average speed, said eight miles per hour. The speed could then be reduced immediately to four miles per hour, so that during the third turn of the time cam tooth 20 would travel over $\frac{4}{10}$ of the third turn of the distance cam and the average rate indication would then be eight miles per hour. If the four mile rate is maintained during the fourth turn of the time cam, tooth 20 will travel over the next $\frac{4}{10}$ of the third turn of the distance cam, and the average speed will then become seven miles per hour. If the speed is now reduced to two miles per hour during the fifth turn of the time cam, tooth 20 will move to the end of the third turn of the distance cam and the average speed will then be six miles per hour. Therefore, at the end of the fifth turn of the time cam the vehicle will have traveled three miles in thirty minutes or at an average rate of six miles per hour, although the speeds for the first and second turns were ten miles per hour; for the third and fourth turns four miles per hour and for the fifth turn two miles per hour. Average rates below ten miles per hour and above one hundred miles per hour can readily be read on the dial. For example, for nine miles per hour the pointer will be at the 90 division, for eight miles per hour at the 80 division, and so on. If the dial has moved through the 10 mark and to the 20 mark the indication will be two hundred miles per hour, and so on. The average speed most likely to be maintained during ordinary operation of automobiles would be between ten and perhaps forty miles per hour and the corresponding divisions on the dial being farthest apart for these averages, very accurate readings can be taken. The dial, however, can be made sufficiently large so that all indications throughout the entire range could be accurately read to small decimals. Where each motion train comprises three order gears, as shown, the gears would have to be re-set to the starting point after the vehicle had run one thousand miles or for one hundred hours.

In the arrangement described the time cam rotates one revolution each six minutes and the distance cam makes one revolution for each mile of travel. The gearing relations between the clock and time cam and between the vehicle and the distance cam can, however, be varied to increase or decrease the capacity of the device. For example, the time cam could be rotated one revolution each thirty-six seconds and the distance cam given a proportional rate of rotation equal to one rotation for each tenth mile of travel. The zero turn would then extend over a time period of thirty-six seconds and a distance period of one-tenth mile, but the capacity of the device would be reduced one-tenth and would be one hundred miles for distance and ten hours for time. Likewise, the time cam can be given one rotation per hour and the distance cam correspondingly driven to rotate one revolution for every ten miles of travel. The zero turns would then cover respectively one hour and ten miles, but the capacity of the device would be increased ten-fold, and would be ten thousand miles for distance and one thousand hours for time. The gear ratio between the differential shaft and the dial pointer could also be varied. If this gear relation were 1 to 4 instead of 1 to 8 the pointer would travel through one hundred eighty degrees to cover indications from 10 to 100. The gears and differential mechanism need not necessarily be of the shape shown but could have other forms. Likewise, it is not necessary to use a logarithmic system whose base is 10 but other logarithmic systems could be employed, as for example, the Napierian system could be used which has a base different from 10.

The device could also be used for performing other calculations besides average rate calculations. For example, division could readily be performed with the device shown in the drawing. The dividend would be entered on cam 18 and the divisor on cam 22 and the dial would indicate the quotient. For example, suppose the problem is to divide 8 by 2. Cam 18 is given eight revolutions and cam 22 two revolutions. The logarithmic differential movement will be translated into the arithmetic quotient which will be indicated on the dial. If the numbers to be divided had several decimal orders then the decimal orders could be directly carried into the corresponding decimal order cams. For example, the units order of the dividend would be entered on units distance cam 18, the tens order of the dividend would be entered directly on tens distance cam 29, and so on, and the various orders of the divisor entered directly on the corresponding order cams of the time train, the differential mechanism associating the various entries and causing indication of the quotient on the dial. For example, if 125 is to be divided by 25 cam 18 is given five revolutions, cam 29 two revolutions and cam 30 one revolution, while cam 22 is given five revolutions and cam 39 two revolutions, and the pointer will be moved to indicate 5, which is the quotient of the two numbers.

The device is not limited to calculating and indicating average rates of speed, but can be employed for determining average rates of other forces which can be translated into motion. For example, the device could be utilized to measure average electric power or watt consumption in an electrical circuit. In this case the cam 18 would be connected with the movable element of the wattmeter, and cam 22 would be connected with a time member and the indications on the dial would then be representative of average electric power consumption for a certain length of time. In the same manner average current flow, water flow, air flow, etc., can be measured.

I do not, therefore, wish to be limited to the exact construction, arrangement and use of the device which I have shown and described, and I desire to secure the following claims by Letters Patent:

1. In an average rate instrument, the combination of a member adapted to be driven in proportion to distance, a second member adapted to be driven in proportion to time, means associated with said members for continuously combining the movements thereof into movement proportional to average rate, and means for indicating at any instant the average rate.

2. In an average rate instrument, the combination of coöperating mechanism adapted to be driven in accordance with distance elements and time elements and adapted to combine said elements into an average rate element, and means for indicating at any instant said average rate element.

3. In calculating mechanism, the combination of differential mechanism comprising two receiving members and a differential member associated therewith, a driving member for each receiving member, said driving members being adapted for connection with driving sources to be driven arithmetically thereby, logarithmic drive connection between said driving members and said receiving members whereby the arithmetic movements of said driving members are translated into logarithmic movements of the receiving members, an indicating member connected with the differential member to be actuated in proportion to the logarithmic differential movement between the receiving members, and a logarithmic scale associated with said indicating member to indicate the anti-logarithmic functions of the logarithmic differential movements.

4. In calculating mechanism, the combination of differential mechanism comprising two receiving members and a differential member associated therewith to be driven in accordance with the differential movements of the receiving members, a driving cam for each receiving member adapted for connection with a driving force to be arithmetically driven thereby, a cam tooth for each receiving member, each driving cam having a logarithmic cam slot for receiving the tooth of the corresponding receiving member, the logarithmic cam slots and teeth coöperating to translate the arithmetic movements of the cams into logarithmic movements of the receiving members, an indicating member driven by the differential member in accordance with the logarithmic differential movement of the receiving members, and a logarithmic scale coöperating with said indicating member to translate the logarithmic movements of the indicating member into arithmetic functions of such movements.

5. In a calculating instrument, the combination of differential mechanism comprising two receiving members and a differential member associated therewith to be driven in accordance with the differential movement of said receiving members, a driving train for each receiving member adapted for connection with driving forces to be driven arithmetically thereby, a cam tooth for each receiving member, each driving train comprising a plurality of decimal order cams connected together in driving relation and each cam having a logarithmic cam slot, the logarithmic cam slots coöperating with the teeth on the receiving members to translate arithmetic movement of the train into logarithmic movement of the receiving members, and means for indicating the movement of the differential member.

6. In a calculating instrument, the combination of differential mechanism comprising two receiving members and a differential member associated therewith to be driven in accordance with the differential movement of said receiving members, a driving train for each receiving member adapted for connection with driving forces to be driven arithmetically thereby, a cam tooth for each receiving member, each driving train comprising a plurality of decimal order cams connected together in driving relation and each cam having a logarithmic cam slot, the logarithmic cam slots coöperating with the teeth on the receiving members to translate arithmetic movement of the train into logarithmic movement of the receiving members, an indicating member driven by the differential member of the differential mechanism in accordance with the logarithmic differential movement of the receiving members, and a logarithmic scale coöperating with the indicating member to translate the logarithmic differential movement into arithmetic indication of such movement.

7. In an average rate instrument, the combination of a member adapted to be driven in proportion to distance, a second member adapted to be driven in proportion to time, means associated with said members for combining the movements thereof into movement proportional to average rate, and means for indicating at any instant the average rate from the time of starting of the distance member, said members and means all operating continuously and simultaneously.

8. In an average rate indicating instrument, the combination of a member adapted to be driven continuously in accordance with distance, another member adapted to be simultaneously driven continuously in accordance with lapse of time, means for continuously combining the movements of the members into movement indicative of average rate, and means for at any instant indicating the average rate.

9. In a calculating machine, means adapted to be actuated in accordance with increments of distance, means adapted to be actuated in accordance with increments of time, integrating mechanism for automatically integrating the increments in accordance with the resultant average rate element, and indicating means operating simultaneously during such integration to indicate at any instant the average rate element.

10. In a calculating device, the combination of a differential member, a driving member adapted to be moved arithmetically at a uniform fixed speed and coupled with said differential member to translate such arithmetic movement into uniformly accelerating movement of the differential member, a companion differential member, a second driving member adapted to be given increments of arithmetic movement at uniform speed and to translate such increments of arithmetic movement into accelerating or retarding movement of the companion differential member, and differential mechanism associated with both differential members to be driven in accordance with the differential movement of said differential mechanism to be driven to indicate the resultant of the relative movements of the differential members.

11. In an average rate calculating instrument, the combination of a time element adapted to be driven in accordance with lapse of time, a distance element adapted to be driven in accordance with distance, differential mechanism comprising two receiving members and a differential member associated therewith to be driven in accordance with the differential movements of the receiving members, a logarithmic cam connecting said time element with one of said receiving members, and a logarithmic cam connecting said distance element with the other of said receiving members whereby said receiving members will be logarithmically driven and said differential member driven in accordance with the differential movements of said receiving members, and indicating mechanism connected with said differential member to be driven thereby to indicate at any instant the average rate.

12. In an average rate calculating instrument, the combination of a time element adapted to be connected with a source to be driven in accordance with lapse of time, a distance element adapted for connection with a source to be driven in accordance with distance, differential mechanism comprising two receiving members and a differential member connected therewith to be driven in accordance with the differential movement of said receiving members, logarithmic drive connection between said time element and one of said receiving members and logarithmic drive connection between said distance element and the other receiving member whereby said receiving members will be driven logarithmically, and indicating mechanism connected with said differential member to be driven thereby in accordance with the differential movement of said receiving members to indicate at any instant the average rate of movement of said distance element.

13. In a mechanical movement, in combination, two rotative elements, driving means imparting to each element an angular movement proportional to the logarithm of the expressed value of the movement of said driving means, and a third element coöperating with said rotating elements, whereby its movement represents the sum or difference of said logarithms.

14. In combination, a differential gear, a logarithmic cam adapted to drive one side of said differential gear, a second logarithmic cam adapted to drive the opposite side of said differential gear in reverse direction and a pointer connected to the middle member of said gear, whereby said pointer indicates the difference between the opposite rotations of said opposite sides.

In witness hereof, I hereunto subscribe my name this sixth day of October A. D. 1909.

FREDERICK A. POOLE.

Witnesses:
CHARLES J. SCHMIDT,
NELLIE B. DEARBORN.